March 7, 1967 A. DE BOER ETAL 3,307,413
MAGNETICALLY SWITCHED GYRO

Filed Sept. 16, 1963 2 Sheets-Sheet 1

INVENTORS
Albert De Boer
Lloyd G. Miller
BY *Price & Heneveld*

Attorneys

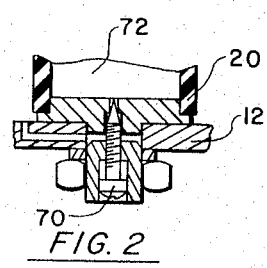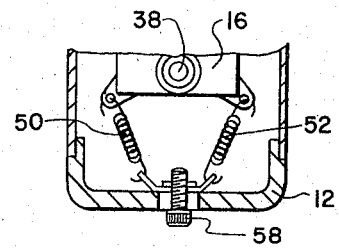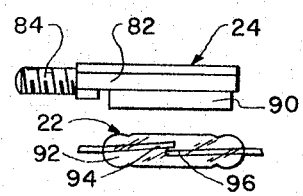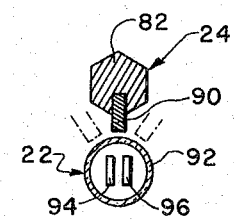

United States Patent Office 3,307,413
Patented Mar. 7, 1967

3,307,413
MAGNETICALLY SWITCHED GYRO
Albert de Boer, Grand Rapids, and Lloyd G. Miller, Rockford, Mich., assignors to Lear Siegler, Inc.
Filed Sept. 16, 1963, Ser. No. 308,940
16 Claims. (Cl. 74—5.6)

This invention relates to gyroscopes for vehicles, and more particularly to a "switching rate gyroscope," i.e. a gyroscope capable of creating an electrical switching action at a predetermined rate of turn of the vehicle.

Vehicles such as spacecraft, aircraft, and submersible watercraft, when employing automatic pilot systems or movement indicator systems, conventionally employ what is designated a "switching, rate gyroscope," as a control element on yaw-turn relationships.

Automatic pilot systems employ a vertical gyroscope to detect and correct for roll or tilt of the craft off the horizontal plane. However, when the plane makes a turn, which can be either left or right, a centrifugal force is exerted on the liquid in the conventional liquid-containing switch which indicates vertically of both roll and pitch axis of a vertical gyroscope. This switch fluid will sense the centrifugal force of a turn rate and transmit erroneous information to the roll erection torques of the vertical gyro. To prevent this from happening, a switching rate gyro is employed to disconnect the roll erection circuit when a predetermined rate of turn is exceeded.

Conventional switching, rate-gyroscopes used for this purpose employ oil-immersed, roto-containing gimbals mounted on a base in a sealed housing. One type of conventional rate gyroscope has one electrical contact mounted on the gimbal and the other on the base. When the craft turns and causes the gyroscope gimbal to precess, the electrical contacts are physically forced together by movement of the one contact, to allow an electrical signal to pass therebetween and disconnect the erection circuit of the vertical gyro.

Another type of conventional switching, rate gyroscope has a gimbal-mounted contact that slides along an arcuate stationary contact mounted on the base, so that with various rates of precessing, a signal will be transmitted therebetween. In both of these types, the amount of electrical energy that can be transferred between the oil immersed contacts is limited. One reason for the limitation is the potential decomposition of oil in the bath with high energy current passage. With silicone oil, which is normally employed today, decomposition causes formation of more or less solid particles. This is obviously detrimental to the instrument. A typical maximum electrical transfer in these prior units is about 0.00084 volt amps. Consequently, amplification equipment is always necessary to enable the signal through these conventional switching rate gyroscopes to be amplified to a value of sufficient strength to operate a relay which electrically disconnects causing the roll erection system of the vertical gyro to be disconnected. Amplification necessarily adds a considerable amount of expense, and consumes a considerable amount of valuable space. Moreover, the direct physical connection necessary between the movable gimbal contact and the fixed base contact causes an additional physical force to be applied to the gimbal, thereby potentially lessening the sensitivity of the unit. With the sliding contact type mentioned above, a substantially frictional force is created between the fixed contact and the sliding contact if the connection between the contacts is to be electrically operable.

It is an object of this invention to provide a switching, rate gyroscope wherein both switch contacts are fixedly mounted on either the gimbal or the gyroscope base so that no rubbing or other direct physical contact is made between elements on the gimbal and elements on the base, to lessen the sensitivity of the unit. Yet the contacts can be tightly pressed together for optimum electrical transfer. Only one pair of contacts is employed. Both contacts can be fixedly attached. The unit does not require pivotally mounted or slidably mounted contacts.

It is another object of this invention to provide a switching, rate gyroscope with sufficient electrical energy-transferring capacity to completely eliminate the need for electrical amplification equipment in order to obtain a useful output signal. The electrical energy transferred through the switching, rate gyroscope is many, many times greater than the presently allowable maximum. In fact values of 10 va are very practical.

It is still a further object of this invention to provide a rate gyroscope that is highly adjustable, with a variable sensitivity to rate of turn before switch actuation occurs, and with a variable maximum angle of gimbal precession and time of recovery, to suit the characteristics of the vehicle with which it is employed.

These and several other objects of this invention will be readily apparent upon studying the following specification in conjunction with the drawings in which:

FIG. 2 is an enlarged, sectional fragmentary view of the dash pot adjusting means in the gyroscopic apparatus illustrated in FIG. 1;

FIG. 4 is an enlarged fragmentary sectional view taken on plane IV—IV of FIG. 1;

FIG. 6 is an enlarged view of the reed switch and magnet actuator of the apparatus illustrated in FIG. 1; and FIG. 7 is an enlarged sectional view of the magnetic reed switch and magnet actuator.

Figure 1:
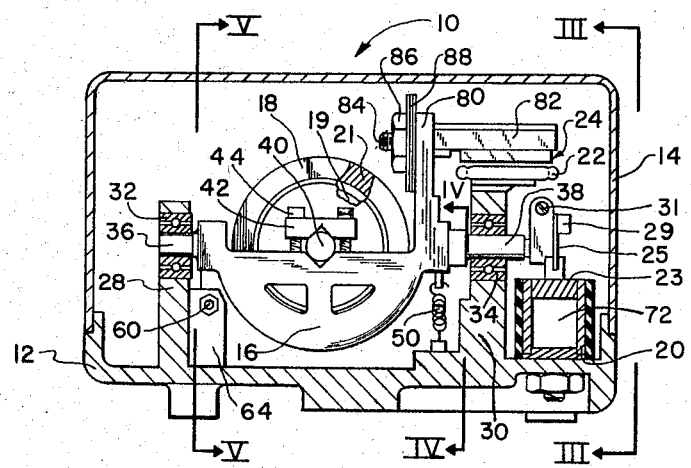
FIG. 1 is a side elevational sectional view of the novel electrically switching rate gyroscope.
Figure 3:
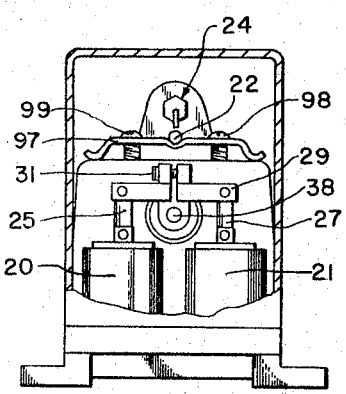
FIG. 3 is an end, elevational, partially cutaway view of the apparatus illustrated in FIG. 1 taken on plane III—III.
Figure 5:
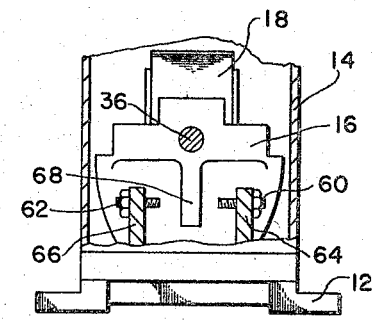
FIG. 5 is a fragmentary sectional view taken on plane V—V of FIG. 1.

Referring now specifically to the drawings, the novel rate gyroscope 10 includes a main base support 12 which forms the bottom of the enclosure housing covered by housing cap 14. Mounted on the base within the housing are gimbal 16, spin assembly 18, precession damping dash pots 20 and 21, magnetic reed switch assembly 22, and switch actuator magnet assembly 24.

The base 12 may comprise a suitable casting or the equivalent. It includes a pair of upstanding pedestals 28 and 30 which supports bearings 32 and 34 respectively. These bearings rotatably receive the end shafts 36 and 38 of the gimbal 16. The coaxial bearings and end shafts form a precession axis. The gimbal supports spin assembly 18 on a transverse shaft 40 clamped to the gimbal by brackets 42 secured by bolts 44. The rotor 21 forms a spin axis perpendicular to and transverse of the precession axis. The centrally positioned wire wound stator 19 of the spin assembly 18 is mounted on the transversely extending shaft 40. The annular spinning rotor 21 is rotated on bearings around the stator and shaft 40, thus forming the spin axis.

Extending between gimbal 16 and base 12 is a pair of biasing, counter-acting tension coil springs 50 and 52 which center the gimbal on its precession axis so that it normally assumes an untilted position with respect to the horizontal base. The gimbal may be exactly centered by lateral adjustment of the spring bracket 56 held by tightening screw 58.

When mounted in a vehicle, the elongated axis of the assembly, i.e., the precession axis, normally extends toward the front and the rear of the craft, while the transverse spin axis extends transversely of the craft, although this is not a prerequisite for proper operation of the device, since, as long as the spin axis is perpendicular to the yaw input axis (vertical) the rate gyro senses all rates in yaw. Angular precession of the gimbal 16 in one direction or another on this precession axis against the biasing force of these springs is limited to an adjustable maximum by a pair of set screws 60 and 62. These extend laterally through flanges 64 and 66 which form an integral part of base 12. These screws serve as adjustable stop means for the web 68 extending longitudinally from the gimbal 16, to limit rotation of the gimbal about its precession axis.

The rate of precession is controlled by a pair of adjustable dash pots 20 and 21. Each includes a suitable piston 23 pivotally attached to an arm 25 or 27. These arms are in turn pivotally connected at their upper ends to a cross beam 29. The cross beam is secured at its center to the protruding end of end shaft 38 of the gimbal by a split collar and tightening nut 31. The bottom of each dash pot includes a needle valve 70 that is adjustable to allow varying rates of air exit from each dash pot under the compressing force of a depressing piston on the air chamber 72. The dash pots thus serve as controllable dampers for the precession action in either direction.

Extending upwardly from one end of the gimbal is an integral vertical upright 80 which serves as a support for the magnet actuator assembly 24. This includes a magnet holder 82 mounted in cantilever fashion on the support. This magnet holder 82 has a threaded stud 84 extending through the upright and retained by a removable nut 86. Weighting shims 88 may be secured behind the nut to provide perfect balance for the gimbal structure. Fixedly attached to the lower side of the magnet holder 82 and embedded therein as by a pressed fit, is a permanent magnet 90. The lower side of this magnet extends within a short distance, e.g., few thousandths of an inch from the upper surface of a sealed glass tube 92 which houses a pair of magnetic reeds 94 and 96 that form flexible contacts of a reed switch.

The tube or envelope is fixed to a spring metal bracket 97 secured by a pair of studs 98 and 99 to the upper end of pedestal 30. Thus, by tightening or loosening the studs 98 and 99, the vertical position of the switch 22 can be exactly controlled to determine its exact spacing from the activating magnet assembly 24.

The magnetic reeds 94 and 96 are normally placed side by side as illustrated in FIG. 7 so as to be equi-distant from the lower surface of magnet 90 under normal conditions when the gimbal is not precessed. The reeds are illustrated in FIG. 6 rotated 90° purely for ease of explanation. The glass enclosure serves to structurally support the reeds properly with respect to each other and to prevent foreign dirt particles from causing malfunction of the switch.

The inner ends of the reeds are positioned within a short distance of each other. The outer ends extend through the ends of the protective envelope 92 for connection to electrical wiring leads (not shown). The leads may connect for example, to a suitable relay (not shown) used to activate the disconnection of the roll erection circuit of a vertical gyro.

The adjacent portions of the reeds may be magnetically charged with like polarity such that, for example, the north inner end of one reed repels the north inner end of the opposite reed. The switch then assumes a normally open switching position as illustrated for example in FIG. 6. The reeds are fixed to the envelope, but can flex over their length, thereby enabling a switching action without pivotal joints, etc. The activating magnet 90, when equi-distantly spaced from these reeds, does not affect them. If the magnet is shifted closer to one reed than the other, however, it causes actuation of the reeds by overcoming the magnetic field of that reed to throw the switch. If the reeds are open it causes them to close and thereby complete a circuit. Thus, if the magnet is shifted accurately in either direction as illustrated in phantom in FIG. 7, this will occur. The same switching action occurs in either case to deactivate the erection system of the roll axis of a vertical gyroscope. This occurs even though no physical contact whatever is achieved directly or indirectly between the gimbal and the base as was always necessary heretofore.

Instead of the switch being normally open, the inner ends of the reeds may be charged with an opposite magnetic field, i.e. north and south, to be attracted to each other and thus to be normally closed. Shifting of the activating magnet from its equilibrium position to a position closer to one reed than the other or vice versa, causes the strong magnetic field of the actuating magnet to supplement or overcome that of the reeds to open the reeds. By using an appropriate circuit to the relay, the signal from the opening reeds can likewise be employed to disconnect the erection system. The basic reed material is a magnetic, metallic base coated with a good electrical contact material such as gold, silver or rhodium. These switches can be obtained presently from distributors such as Hamlin, Inc., Lake Street, Lake Mills, Wisconsin.

In operation, base 12 is mounted in a craft with typical connecting means so that the longitudinal precession axis is usually, but not necessarily, fore and aft of the vehicle, and the spin axis is transverse of the vehicle. Electrical energy is supplied through suitable wiring (not shown) to the windings of the stator 19 to constantly spin the rotor 21 inside the protective housing of the spin mechanism. When the craft in forward motion is turned either left or right, the gimbal is angularly precessed on its precession axis in either one direction or the other depending upon the direction of turn. This precession torque is created in accordance with conventional gyroscopic principles. This precession occurs against the biasing force of one of the springs 50 or 52, and also against the damping influence of one of the adjustable dash pots 20 and 21. When so precessed, the pillar 80 is likewise rotated to shift magnet actuator 24 with respect to the fixedly mounted switch 22. This causes the magnet to move from its equidistant relationship with respect to the reeds 94 and 96 to a position closer to one than the other. This causes the reeds to contact each other if they are normally open, or to spread apart from each other if they are normally closed. In either case, the switch is "thrown" to activate an electrical circuit (not shown) through leads attached to the switch reeds. The circuit is connected to the yaw sensor through a relay to electrically disconnect the erection circuit, etc. from the automatic control equipment.

It will be realized that the gimbal is responsive to rate of turn (degrees/sec.) rather than mere degrees of turn. Therefore, by regulating the dash pot outlet valve, the rate of turn needed to provide sufficient precession to shift the magnet 24 enough to activate the switch can be readily adjusted merely by turning one of the needle valve set screws 70. Closing down of the valve necessitates a greater rate of turn to obtain the same rate of precession.

Also, in order to limit the maximum amount of precession and thereby control the time of return of the gimbal from the precessed condition to the normal condition, set screws 60 and 62 are adjusted to limit the extent of movement of the gimbal web 68.

It has been found that by employing this novel mechanism, the amount of electrical power which can be transmitted through the system is at least 12 volt amps as compared to 0.00084 volt amp on conventional type equipment. Consequently, the amplification equipment previously required is no longer necessary, thereby substantially decreasing both the amount of space consumption, and the expense of the unit. The signal achieved through the switch may be simply passed through a relay, with the relay output signal being employed to electrically and temporarily disconnect the erection circuit, etc. from the automatic control mechanism.

It will be realized that although the magnet is shown mounted on the gimbal and the switch is shown mounted on the base support, this relationship may be reversed without affecting the principles of the invention taught. Also, instead of using a permanent magnet, an electromagnet may be substituted, provided it can serve as a switch activator.

Further, more than one magnet and one switch may be utilized for specific uses. For example, two switches and one magnet or one switch and two magnets, or two magnets and two switches can be mounted to perform the same basic function. The device is not limited to mounting of the switches parallel to the magnet, but could as well be mounted 90° to the longitudinal axis of the magnet or vice versa.

Various additional advantages and slight structural modifications may readily occur to those in the art upon studying the unique assembly described. These obvious modifications are deemed to be a part of this invention, if within the scope of the appended claims or the reasonably equivalent structures to those defined therein.

We claim:

1. A switching, rate gyroscope comprising: a support base; a gimbal pivotally mounted on a precession axis on said base; a spin assembly mounted on a spinning axis on said gimbal; a reed switch comprising a pair of adjacent magnetic contact reeds; a switch actuating magnet adjacent said reeds; one of said reed switch and magnet being affixed to said base, and the other being affixed to said gimbal; said spin axis being transverse to said precession axis causing said gimbal to be precessed with a turn of said base, thereby causing a change of relationship between said reeds and magnet; said change causing actuation of said magnetic reeds to throw said switch.

2. A switching, rate gyroscope comprising: a support base; a gimbal pivotally mounted on a precession axis on said base; a spinning rotor mounted on a spinning axis on said gimbal; a reed switch comprising a pair of adjacent, magnetic, flexible contact reeds; an actuating magnet adjacent said reeds; one of said reed switch and magnet being affixed to said base, with the other being affixed to said gimbal; said magnet normally being substantially equi-distant from said contact reeds; and said magnet being substantially closer to one of the two reeds with precession of said gimbal in one direction, and closer to the other of the two reeds with precession of said gimbal in the opposite direction, thereby causing a like switching action between said reeds with precession in either direction.

3. The gyroscope in claim 1 wherein adjustable stop means are provided on said base on opposite sides of said axis of precession to contact said gimbal and limit the maximum angle of precession in either direction.

4. The gyroscope in claim 2 wherein a pair of adjustable, precession-damping dash pots are operably mounted between said base and said gimbal to enable adjustment of the rate of precession of said gimbal in either direction.

5. A gyroscope comprising: a support base; a gimbal pivotally mounted on said base on a precission axis; biasing means biasing said gimbal to a normal unprecessed position with respect to said base; a spin assembly pivotally mounted on said gimbal on a spinning axis transverse to said precession axis, such that a turning force on said base causes said spin assembly to precess said gimbal; magnetic switch contacts adjacent each other; an actuating magnet adjacent said switch contacts; one of said magnet and said contacts being affixed to said gimbal, and the other being affixed to said base; precession of said gimbal in either direction away from its normal position causing a relative change of position of said magnet with respect to said contacts, creating a switching action between said contacts, and said biasing means causing return of said precessed gimbal to normal position.

6. The gyroscope in claim 5 wherein said biasing means comprises a pair of springs between said gimbal and base, on opposite sides of said axis of precession.

7. The gyroscope in claim 5 wherein said contacts comprise a pair of flexible magnetic reeds enclosed in a protective envelope.

8. The gyroscope in claim 6 wherein adjustable stop means is provided on said base on opposite sides of said axis of precession to contact said gimbal and limit the maximum angle of precesison in either direction.

9. The gyroscope in claim 8 wherein a pair of dash pots having adjustable outlets are operably mounted between said base and said gimbal to enable adjustment of the rate of precession of said gimbal in either direction.

10. The gyroscope in claim 7 wherein said envelope is mounted on a flexible spring bracket secured to said support base, and wherein said spring bracket can be flexed varying amounts to control the spacing of said envelope and reeds with respect to said magnet.

11. A switching, rate gyroscope comprising: a support base; a gimbal pivotally mounted on a precession axis on said base; a spin assembly mounted on a spin axis on said gimbal; reed switch means comprising a plurality of magnet contact reeds; switch actuating magnet means adjacent said reeds; either one of (a) said magnet means and (b) said reed switch means being affixed to said gimbal; said spin axis being transverse to said precession axis causing said gimbal to be precessed with a turn of said base, thereby causing a change of relationship between said reeds and magnet means; said change causing actuation of said magnetic reeds to throw said switch means.

12. A switching, rate gyroscope comprising: a support base; a gimbal pivotally mounted on a precession axis on said base; a spin assembly mounted on a spinning axis on said gimbal; a plurality of reed switches, each comprising a pair of adjacent magnetic contact reeds; switch actuating magnet means adjacent said reeds; either one of (a) said magnet means and (b) said plurality of reed switches being affixed to said base, and the other being affixed to said gimbal; said spin axis being transverse to said precession axis causing said gimbal to precess with a turn of said body, thereby causing a change of relationship between said reeds and magnet means; said change causing actuation of said magnetic reeds to throw at least one of said of plurality of reed switches.

13. The gyroscope in claim 12 wherein said magnet means comprises a plurality of magnets, each cooperating with a pair of contact reeds.

14. A gyroscope comprising: a support base; a gimbal pivotally mounted on said base on a precession axis; biasing means biasing said gimbal to a normal unprecessed position with respect to said base; a spin assembly pivotally mounted on said gimbal on a spinning axis transverse to said precession axis, such that a turning force on said base causes said spin assembly to precess said gimbal; a plurality of magnetic switch contacts; actuating magnet means adjacent said switch contacts; either one of (a) said magnet means and (b) said switch contacts being affixed to said gimbal, and the other being affixed to said base; precession of said gimbal in either direction away from its normal position causing relative change of position of said magnet means with respect to said contacts, creating switching action between said contacts and said biasing causing return of said precessed gimbal to normal position.

15. The gyroscope in claim 14 wherein said biasing means comprises a pair of springs between said gimbal and base, on opposite sides of said axis of precession.

16. The gyroscope in claim 14 wherein said contacts comprise flexible magnetic reeds enclosed in a protective envelope.

References Cited by the Examiner

UNITED STATES PATENTS

| | | | |
|---|---|---|---|
| 2,109,953 | 3/1938 | Bates | 74—5.46 X |
| 2,836,070 | 5/1958 | Stokes et al. | 74—5.5 |
| 3,142,181 | 7/1964 | Moller | 74—5.4 X |

FRED C. MATTERN, JR., *Primary Examiner.*

BROUGHTON G. DURHAM, *Examiner.*

T. W. SHEAR, J. D. PUFFER, *Assistant Examiners.*